Feb. 23, 1937.      C. J. CALLAHAN      2,071,331
LENS MOUNTING
Filed Jan. 11, 1935
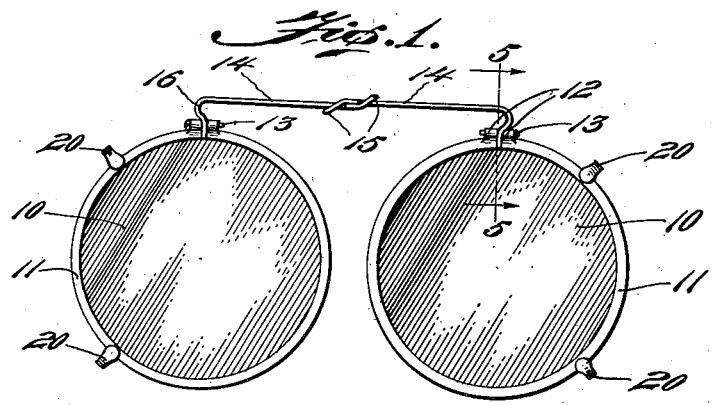
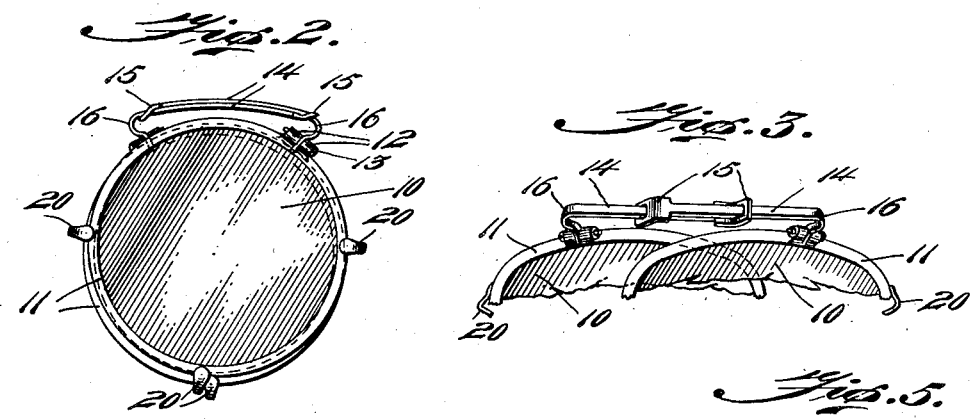
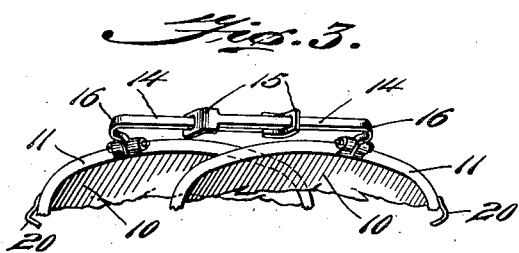
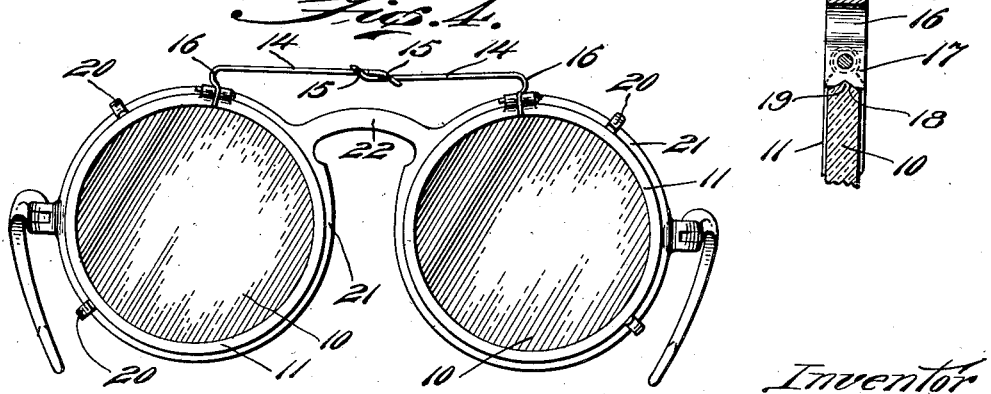
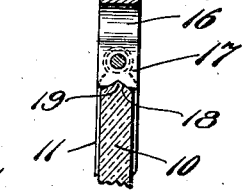
Inventor
Charles J. Callahan
By Perley H. Plant
Attorney Patented Feb. 23, 1937

2,071,331

UNITED STATES PATENT OFFICE 2,071,331

LENS MOUNTING

Charles J. Callahan, Providence, R. I., assignor of one-half to Edward A. Johnson, Taunton, Mass.

Application January 11, 1935, Serial No. 1,305

5 Claims. (Cl. 88—41)

This invention relates to a lens mounting of a type which is adapted for attachment to spectacles or eye-glasses of the usual character to provide a modification of the visual characteristics of the lenses ordinarily employed, or for use with colored or tinted lenses in order to relieve the glare from the sun, snow or bright lights of any description, or which is capable of use independently of other mountings to provide a foldable eyeglass structure.

One object of the invention is the provision of a lens mounting of this character so constructed as to be capable of being extended sufficiently to engage the usual spectacle or eyeglass frames and locate the lenses carried thereby in substantial coincidence with the lenses of the spectacles or eyeglasses, as well as to be employed as an eyeglass structure and allow the lenses to be moved into substantially complete telescoping relation with each other and folded into a small compass.

Another object of the invention is the provision of a lens mounting of this character wherein the separate lens rim members may be extended to substantially coincide with the pupillary distance of the eyes or be moved into substantial coincidence with each other through the telescoping character of the lens connecting or bridge members.

A further object of the invention relates to the manner of forming the parts and connecting each lens rim member with the bridge member so as to maintain each lens rim member in the proper angular position relative to the bridge.

A further object of the invention is the provision of novel means for mounting the lens rim members on the composite bridge member so as to hold them each firmly in position relative to one of the bridge members and prevent a tilting movement of either lens relative to the bridge member, as well as to provide means supplementing the telescoping character of the bridge members for positioning the lens rim members in suitable longitudinally spaced relation with each other.

Other objects and advantages of the invention relate to various improved details of construction and novel arrangements of the parts as will be more fully set forth in the detailed description to follow.

Referring to the drawing:

Fig. 1 is a front elevational view of the lens mounting, showing the lenses in their separated or horizontally spaced positions, such as would approximate that occupied by them when applied to an eyeglass or spectacle frame or substantially the position they would occupy when the mounting is employed as nose glasses and applied directly to the nose of the user.

Fig. 2 is a front elevational view of the mounting showing the bridge member parts in their telescoped relation and with the lenses in folded position.

Fig. 3 is a perspective view of the structure looking downwardly towards the bridge member, showing the bridge member parts in partially extended position, and illustrating the manner in which they are capable of being telescoped to bring the lenses into folded relation.

Fig. 4 is a rear elevational view of the lens mounting showing the position of the parts when applied to a spectacle frame, and, Fig. 5 is a detail sectional view, taken substantially along the line 5—5 of Fig. 1.

In the embodiment of the invention illustrated herewith the lenses 10 are each surrounded by a split rim 11 formed of grooved or channeled material terminating in outwardly extending lugs 12 provided with suitable openings for receiving a screw or the like 13 to firmly clamp the rim members in position upon the lenses and secure each rim member to one of two telescoping bridge members 14. Each telescoping bridge member 14 is provided with an offset end portion 15 provided with an opening for receiving slidably a portion of the other bridge member, and has the opposite end portion curved as indicated at 16 to increase the resiliency of the bridge member. The extreme end portion 17 of each bridge member located adjacent the curved portion 16 is substantially straight, is adapted to be positioned between the lugs 12 carried by one of the lens holding rims, and is provided with a transverse end depression 18 for receiving the edge 19 of one of the lens members to retain each lens member in the desired angular position with reference to the bridge member.

Each rim member 11 may be formed from eye-wire of the usual character and so constructed as to provide lugs 12 at opposite ends thereof for receiving the connecting screw or pin 13. Each rim member may also be provided with laterally projecting spaced lugs 20 which may be curved to engage over the lens rims 21 of a spectacle or eyeglass frame 22 so as to position the lenses 10 in parallel relation with and over the lenses of the spectacles or eyeglasses, as shown more particularly in Fig. 4 of the drawing. Certain of the curved lugs 20 are also adapted to interengage with each other in the folded position of the lenses to retain the lenses in their telescoped folded positions until they may be released for extension, as is shown in Fig. 2 of the drawing.

In the use of the lens mounting as an adjunct for application to a spectacle or eyeglass frame, the bridge members 14 may be moved outwardly relative to each other to the limits of their movement and sufficient force then applied to rotate each lens rim member slightly and partially straighten the curved portions 16, whereby the lens rim members are positioned at such a distance from each other as to fit over the lens rims of a spectacle frame, as shown in Fig. 4 of the drawing. When the lens rim members 11 are thus extended the lugs 20 carried by each rim member may be located at substantially equal distances above and below the horizontal axes of the lenses so as to engage firmly the lens rims of the spectacle frame.

When the mounting is employed in the formation of foldable eyeglasses, that is separate and independent from any other lens carrying frame, a nose guard may be applied to the inner edge portion of each lens rim member so as to be located substantially within the plane of the lens rim member, as is well-known in devices of this character, for engagement with the nose of the wearer when the lenses are moved into their extended positions, as shown in Fig. 1.

In either case, the mounting may be folded by first telescoping the bridge members 14 to the limit of their telescoping movement whereupon the lenses are moved to a position of extremely or nearly complete opposition with each other, when they may be rotated slightly to spring one of the lugs 20 of one lens rim member into engagement with a corresponding lug carried by the other lens rim member so that these lugs 20 may interlock to hold the lenses in completely folded position, as shown in Fig. 2 of the drawing.

It will be understood from the above that the degree of telescoping movement permitted to the bridge members 14 is sufficient to provide for a wide movement of the lens rim members from a position of approximately complete lateral coincidence to a position in which the lenses are substantially spaced from each other longitudinally. Such additional movement of the lens rim members relative to each other as may be required for the purpose of adapting the lens rim members for application to the nose of the wearer or to the lens rims of a spectacle frame may be accomplished by forcibly drawing the lens rim members outwardly after the bridge members have reached the limit of their extensible movement to rotate each lens rim member slightly about its point of attachment to the bridge member and partially straighten the curved portions 16 so as to allow the lens rim members to assume the position shown in Fig. 1, or even a more extended position if the same may be found to be desirable.

In assembling the parts each lens rim member is positioned about the peripheral edge of one of the lenses 10, and the end portion 17 of one of the bridge members is inserted between the ends of the lens rim member in such a manner that the groove 18 formed in the end of the bridge member will receive the angular or curved edge 19 of the lens so as to hold the lens and lens rim member against tilting movement relative to the bridge member 14 when the pin or screw 13 has been passed through the lugs 12 and end of the bridge member after the manner shown in the drawing.

What I claim is:

1. In a lens mounting, a pair of divided lens rim members, and interconnected telescoping bridge members each having an end portion secured between the end portions of one of said lens rim members and provided with a free resilient curved portion located adjacent to its point of connection with the lens rim member and extensible within the plane of the lens rim member under strain to effect the extension of said rim members relative to each other in a longitudinal direction beyond the limit of the telescoping movement of said bridge members.

2. In a lens mounting, a pair of lens rim members, interconnected telescoping bridge members each having one end portion secured to one of said lens rim members and the opposite end slidably engaging a portion of the other bridge member to provide means for positioning said lens rim members in longitudinally spaced relation with each other or for locating them in a position of substantial lateral opposition with each other and extensible means carried by said bridge members and located adjacent to their points of connection with the lens rim members and each extensible in a plane coinciding substantially with the plane of the lens rim member for permitting movement of said lens rim members outwardly from each other beyond the limit of their telescoping movement.

3. In a lens mounting, a pair of transversely divided lens rim members, flexible interconnected telescoping bridge members each having an end portion secured between the adjacent ends of one of said lens rim members and provided with a resilient portion bent back upon itself substantially within the plane of the lens and located adjacent to its point of attachment to the ends of a rim member and extensible upon the application of force in excess of that required for moving the telescoping body members to the limit of their extended relation for effecting the extension of said lens rim members relative to each other in a longitudinal direction beyond the limit of the telescoping movement of said bridge members, and interengaging means carried by said lens rim members for retaining them in folded position substantially in lateral opposition with each other.

4. In a lens mounting, a pair of divided lens rim members, and telescoping bridge members each provided with a straight portion and having one end portion bent out of the plane of the straight portion and provided with an opening slidably receiving the straight portion of the other bridge member to provide freely telescoping portions readily movable into extended relation when in use and into retracted position relative to each other to bring the lens rim members into substantial lateral coincidence and having a thin resilient curved portion lying substantially in the plane of a lens rim member and located adjacent to the opposite end thereof extensible upon the application of force in excess of that required to move the bridge members to the limits of their extended relation for effecting further separation of the rim members, the free end adjacent to the curved portion being clamped between the free ends of one of said divided lens rim members to permit both free sliding and bending movement of said rim members towards and from each other as well as movement of said lens rim members away from each other beyond the limits defined by the sliding movement of the parts.

5. An auxiliary lens holding device comprising a pair of lenses provided with lens rims each having spaced laterally extending lugs adapted for attachment to a spectacle frame, said lens rims being each divided and provided with holding means for retaining the free ends in connected relation, a pair of bridge members each having a straight portion and one end telescopingly engaging the straight portion of the other bridge member and each provided adjacent to the opposite end with a curved resilient portion extensible in the plane of one of the lenses to vary the distances separating the centers of the lenses beyond the limits defined by the telescoping action of the bridge members, the said last named ends of said bridge members being each secured to one of said lens rims by said lens rim holding means.

CHARLES J. CALLAHAN.